United States Patent
Fujii et al.

(10) Patent No.: US 7,924,490 B2
(45) Date of Patent: Apr. 12, 2011

(54) OSCILLATOR DEVICE, OPTICAL DEFLECTOR AND IMAGE FORMING APPARATUS USING THE OPTICAL DEFLECTOR

(75) Inventors: Kazunari Fujii, Kawasaki (JP); Hideta Nishizawa, Kawasaki (JP); Kazufumi Onuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/809,052

(22) PCT Filed: Mar. 12, 2009

(86) PCT No.: PCT/JP2009/055370
§ 371 (c)(1),
(2), (4) Date: Jun. 17, 2010

(87) PCT Pub. No.: WO2009/113723
PCT Pub. Date: Sep. 17, 2009

(65) Prior Publication Data
US 2010/0271680 A1 Oct. 28, 2010

(30) Foreign Application Priority Data

Mar. 12, 2008 (JP) ................................ 2008-062784

(51) Int. Cl.
*G02B 26/08* (2006.01)
(52) U.S. Cl. .................................................. 359/224.1
(58) Field of Classification Search .... 359/212.1–214.1, 359/224.1–226.1
See application file for complete search history.

(56) References Cited

U.S. PATENT DOCUMENTS

| 4,859,846 | A | 8/1989 | Burrer | 250/234 |
|---|---|---|---|---|
| 5,047,630 | A | 9/1991 | Confer et al. | 250/235 |
| 7,271,943 | B2 | 9/2007 | Yasuda et al. | 359/224 |
| 7,376,161 | B2 | 5/2008 | Fujii et al. | 372/21 |
| 7,388,702 | B2 * | 6/2008 | Yasuda et al. | 359/224.1 |
| 7,423,795 | B2 | 9/2008 | Kato et al. | 359/224 |

(Continued)

FOREIGN PATENT DOCUMENTS

JP    2005-208578    8/2005

(Continued)

OTHER PUBLICATIONS

U.S. Appl. No. 12/809,053, filed Jun. 17, 2010, by Kazunari Fujii, Hideta Nishizawa and Kazufumi Onuma.

*Primary Examiner* — Euncha P Cherry
(74) *Attorney, Agent, or Firm* — Fitzpatrick, Cella, Harper & Scinto

(57) ABSTRACT

An oscillator device includes an oscillation system having a first oscillator, a second oscillator, a first resilient supporting member and a second resilient supporting member, wherein the oscillation system has at least two frequencies of natural oscillation mode around the torsion axis which include a first resonance frequency f1 and a second resonance frequency f2, wherein there is a relationship that f2 is approximately two-fold of f1, wherein $\Delta f$ which is expressed as $\Delta f = f2 - f \times f1$ has a relationship of $\Delta f < 0$, and wherein the drive control means supplies, to the driving means, a driving signal which is comprised of a driving signal based on synthesizing a first driving signal having a first driving frequency and a second driving signal having a second driving frequency, and which is such driving signal that, when a lower-frequency side driving frequency among the first and second driving frequencies is denoted by Df1 and a higher-frequency side driving frequency is denoted by Df2, it satisfies relationships Df1<f1, Df2>f2 and Df1×2=Df2.

7 Claims, 8 Drawing Sheets

U.S. PATENT DOCUMENTS

| | | | |
|---|---|---|---|
| 7,750,746 B2 | 7/2010 | Onuma | 331/154 |
| 2007/0052797 A1 | 3/2007 | Fujii et al. | 348/102 |
| 2007/0115072 A1 | 5/2007 | Kato et al. | 331/176 |
| 2007/0115526 A1 | 5/2007 | Kato et al. | 359/198 |
| 2007/0273946 A1 | 11/2007 | Kato et al. | 359/199 |
| 2009/0051992 A1 | 2/2009 | Fujii et al. | 359/199 |
| 2009/0067019 A1 | 3/2009 | Kato et al. | 359/198 |
| 2010/0085618 A1 | 4/2010 | Fujii et al. | 359/199.1 |

FOREIGN PATENT DOCUMENTS

| | | |
|---|---|---|
| JP | 2005-250078 | 9/2005 |
| JP | 4027359 B2 | 10/2007 |
| JP | 2007-322506 | 12/2007 |
| WO | 2005/063613 | 7/2005 |
| WO | 2007/094489 | 8/2007 |

* cited by examiner

Δf>0

OSCILLATOR DEVICE, OPTICAL DEFLECTOR AND IMAGE FORMING APPARATUS USING THE OPTICAL DEFLECTOR

TECHNICAL FIELD

This invention relates to an oscillator device having a plurality of oscillators and, more particularly, to an oscillator device which is suitably applicable to an optical deflector. In another aspect, the invention concerns a scanning display unit or an mage forming apparatus such as a laser beam printer or a digital copying machine, for example, having such optical deflector.

BACKGROUND ART

A large variety of optical deflectors having a resonance-oscillated mirror have been proposed. The resonance type optical deflector has the following features, as compared with a conventional optical-scanning optical system using a rotary polygonal mirror such as a polygon mirror: that is, the size of the device can be made very small and the power consumption can be kept low. Particularly, an optical deflector comprising Si monocrystal, which is produced through the semiconductor process, has theoretically no metal fatigue and thus the durability thereof is very good.

On the other hand, in the resonance type deflector, since the displacement angle of the mirror changes theoretically sinusoidally, the angular speed of deflected light is not constant. The following techniques have been proposed to correct this characteristic (see U.S. Pat. Nos. 4,859,846, 5,047,630 and 7,271,943).

In U.S. Pat. Nos. 4,859,846 and 5,047,630, a resonance type deflector having an oscillation mode based on a fundamental frequency and a frequency three-fold the fundamental frequency, is used to achieve the driving in which the displacement angle of the mirror changes like a chopping wave.

FIG. 10 shows a micromirror which realizes such chopping-wave drive. In FIG. 13, an optical deflector 12 is comprised of oscillators 14 and 16, resilient supporting members 18 and 20, driving members 23 and 50, detecting elements 15 and 32, and a control circuit 30. This micromirror has a fundamental resonance frequency and a resonance frequency approximately three-fold the fundamental frequency, and it is driven at a combined frequency of the fundamental frequency and the three-fold frequency. Based on this, the oscillator 14 having a mirror surface is driven by a chopping-wave drive, such that optical deflection with a smaller angular speed change in the displacement angle is accomplished as compared with the sinusoidal drive.

During the driving, the oscillation of the oscillator 14 is detected by the detecting elements 15 and 32, and a driving signal necessary for the chopping wave is generated by the control circuit 30. The driving signal is inputted to the driving members 23 and 50, by which the micromirror is driven. As described above, since the angular speed of the scanning deflection has an approximately-constant angular-speed region which is widened as compared with a case where the displacement angle is based on a sinusoidal wave, the available region relative to the whole area of scanning deflection is enlarged. Here, the drive is performed in accordance with the fundamental frequency and a frequency three-fold the fundamental frequency or, alternatively, a driving frequency based on a three-fold frequency and a one-third frequency of that.

DISCLOSURE OF THE INVENTION

Although chopping wave driving or sawtooth-wave driving of the oscillator of the oscillator device (optical deflector) can be realized by the proposals made in the aforementioned patent documents, further improvements are necessary in regard to the controllability of the displacement angle of the oscillator. Thus, the present invention provides an oscillator device suitable for precise control of the displacement angle.

In accordance with an aspect of the present invention, there is provided an oscillator device, comprising: an oscillation system including a first oscillator, a second oscillator, a first resilient supporting member configured to connect said first oscillator for torsional oscillation about a torsion axis relative to said second oscillator, and a second resilient supporting member configured to support said second oscillator for torsional oscillation about a torsion axis relative to a fixed member; driving means configured to drive said oscillation system; and drive control means configured to supply a driving signal to said driving means; wherein said oscillation system has at least two frequencies of natural oscillation mode around the torsion axis which include a first resonance frequency f1 and a second resonance frequency f2, wherein there is a relationship that f2 is approximately two-fold of f1, wherein $\Delta f$ which is expressed as $\Delta f = f2 - f \times f1$ has a relationship of $\Delta f < 0$, and wherein said drive control means supplies, to said driving means, a driving signal which is comprised of a driving signal based on synthesizing a first driving signal having a first driving frequency and a second driving signal having a second driving frequency, and which is such driving signal that, when a lower-frequency side driving frequency among the first and second driving frequencies is denoted by Df1 and a higher-frequency side driving frequency is denoted by Df2, it satisfies relationships $$Df1 < f1$$

$$Df2 > f2$$

$$Df1 \times 2 = Df2.$$

When a displacement angle of said oscillator is denoted by $\theta$, an amplitude of a first vibrating motion is denoted by $A_1$, an angular frequency of the first vibrating motion is denoted by $\omega_1$, an amplitude of a second vibrating motion is denoted by $A_2$, an angular frequency of the second vibrating motion is denoted by $\omega_2$ ($\omega_2 = 2 \times \omega_1$), a relative phase difference of the two frequencies is denoted by $\emptyset$, and time is denoted by t, said drive control means may supply to said driving means a driving signal effective to cause at least one of said first and second oscillators to produce oscillation which is represented by an expression:

$$\theta(t) = A_1 \sin \omega_1 t + A_2 \sin(\omega_2 t + \emptyset).$$

When, at a lower-frequency side of a resonance peak of the first resonance frequency f1, a frequency with which a vibrational energy becomes equal to a mesial magnitude of a resonance peak is denoted by f1a and, at a higher-frequency side, a frequency with which the vibrational energy becomes equal to the mesial magnitude of the resonance peak is denoted by f1b, $\Delta f$ may be in a relationship of $$-2 \times (f1b - f1a) \leq \Delta f < 0.$$

When, at a lower-frequency side of a resonance peak of the second resonance frequency f2, a frequency with which a vibrational energy becomes equal to a mesial magnitude of a resonance peak is denoted by f1c and, at a higher-frequency side, a frequency with which the vibrational energy becomes equal to the mesial magnitude of the resonance peak is denoted by f1d, $\Delta f$ may be in a relationship of $$(f1d - f1c) \leq \Delta f < 0.$$

When a lower-limit side minimum value in a dispersion range of Δf of said oscillation system is denoted by Δfl and an upper-limit side maximum value is denoted by Δfu, Δf may be in a relationship $$(\Delta fu - \Delta fl) \leq \Delta f < 0.$$

In accordance with another aspect of the present invention, there is provided an optical deflector including an oscillator device as recited above, wherein said first oscillator is provided with an optical deflection element.

In accordance with a further aspect of the present invention, there is provided an image forming apparatus, comprising: an optical deflector as recited above; an optical system; a light source; and a photosensitive member, wherein a light beam from said light source is scanningly deflected by said optical deflector, and the scan light is collected by said optical system at a target position on said photosensitive member.

With the oscillator device of the present invention, more stable driving is enabled relative to external disturbance, and jitter during the oscillation of the oscillator is reduced. Thus, high accuracy control of the displacement angle of the oscillator is enabled.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 3A and 3B are diagrams illustrating vibrational motion of an oscillator device according to the present invention, wherein FIG. 3A shows the relationship between time and the displacement angle and FIG. 3B shows the result of differentiating, with respect to time, the expression which presents the relationship between time and the displacement angle of FIG. 3A.

FIGS. 4A and 4B are diagrams illustrating the transfer characteristic when Δf=+6, wherein FIG. 4A shows the gain characteristic and FIG. 4B shows the phase characteristic.

FIGS. 5A and 5B are diagrams illustrating the transfer characteristic when Δf=−6, wherein FIG. 5A shows the gain characteristic and FIG. 5B shows the phase characteristic.

BEST MODE FOR PRACTICING THE INVENTION

Preferred embodiments of the present invention will now be described with reference to the attached drawings.

First Embodiment

Figure 1:
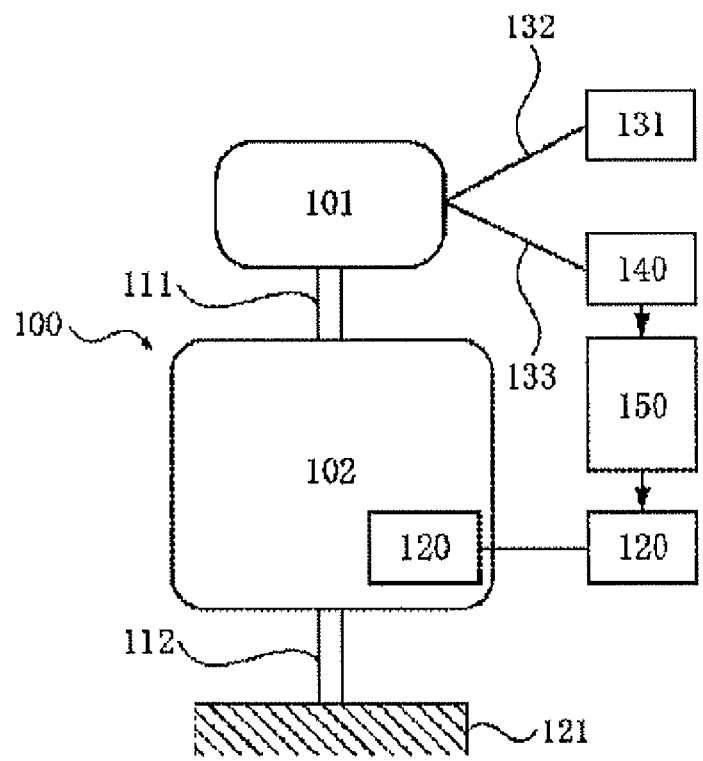
FIG. 1 is a diagram illustrating an oscillator device according to the present invention.

A first embodiment of an oscillator device according to the present invention will be explained. The oscillation system 100 of the present embodiment comprises a first oscillator 101 and a second oscillator 102 as shown in FIG. 1. Furthermore, it comprises a first resilient supporting member 111 for connecting the first oscillator 101 for torsional oscillation about a torsion axis relative to the second oscillator 102, and a second resilient supporting member 112 for supporting the second oscillator 102 for torsional oscillation about a torsion axis relative to a fixed member 121.

An optical deflection element such as a reflection member may be formed on the surface of the first oscillator, for example and, in that occasion, the oscillator device can be used as an optical deflector. The reflection member may be provided by forming a metal thin film such as aluminum by sputtering, for example.

Furthermore, the oscillation system of the present embodiment may have a structure other than the cantilevered structure shown in FIG. 1: e.g., an oscillation system having a structure supported at opposite ends or an oscillation system having a combined structure of cantilevered structure and opposite-end-supported structure, as proposed by Japan Patent No. 4027359.

Driving means 120 has a structure based on an electromagnetic system, an electrostatic system or a piezoelectric system, for example, to apply a driving force to the oscillation system 100. In the case of electromagnetic driving, as an example, a permanent magnet may be provided on at least one oscillator, and an electric coil for applying a magnetic field to this permanent magnet may be disposed adjacent the oscillator. The disposition of the permanent magnet and the electric coil may be reversed. In the case of electrostatic driving, an electrode may be formed on at least one oscillator, and an electrode for providing an electrostatic force acting between it and this electrode may be formed adjacent the oscillator. In the case of piezoelectric driving, a piezoelectric element may be provided in the oscillation system or on the supporting member to apply a driving force.

The oscillation system 100 has at least two natural-oscillation-mode frequencies around the torsion axis, that is, a first resonance frequency f1 and a second resonance frequency f2. There is a relationship that f2 is approximately two-fold of f1. Here, the approximately two-fold relationship means that f1 and f2 are in the relationship of $1.98 \leq f2/f1 \leq 2.02$. The reason that the frequency f2 may not be exactly twice the frequency f1 is that there may be a processing error in the manufacture of the oscillation system.

The displacement angle θ of the oscillator device of the present embodiment is such as follows. When the amplitude, angular frequency and phase of the first vibrating motion are denoted by $A_1$, $\omega_1$ and $\phi_1$, respectively, and the amplitude, angular frequency and phase of the second vibrating motion are denoted by $A_2$, $\omega_2$ ($\omega_2 = 2 \times \omega_1$) and $\phi_2$, respectively, and when time where an appropriate time is taken as an origin or reference time is denoted by t, the displacement angle can be expressed as follows.

$$\theta(t) = A_1 \sin(\omega_1 t + \phi_1) + A_2 \sin(\omega_2 t + \phi_2) \quad (1)$$

Furthermore, when the amplitude and the angular frequency of the first vibrating motion are denoted by $A_1$ and $\omega_1$, respectively, the amplitude and the angular frequency of the second vibrating motion are denoted by A2 and $\omega_2$ ($\omega_2 = 2 \times \omega_1$), respectively, a relative phase difference between the two frequencies is denoted by ø, and time is denoted by t, the displacement angle θ of the oscillator device can be expressed as follows.

$$\theta(t) = A_1 \sin \omega_1 t + A_2 \sin(\omega_2 t + \phi) \quad (2)$$

Figure 3A:
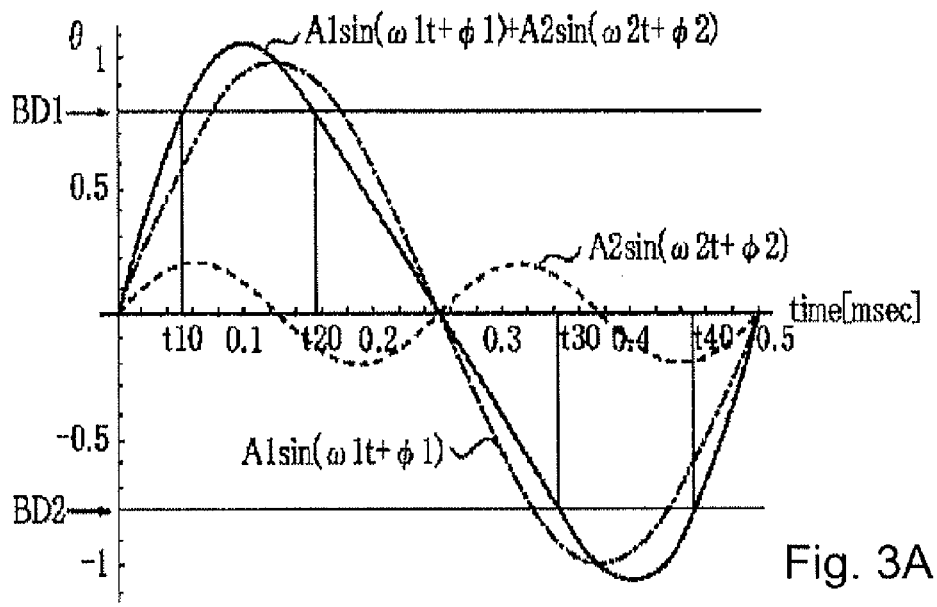
Figure 3B:
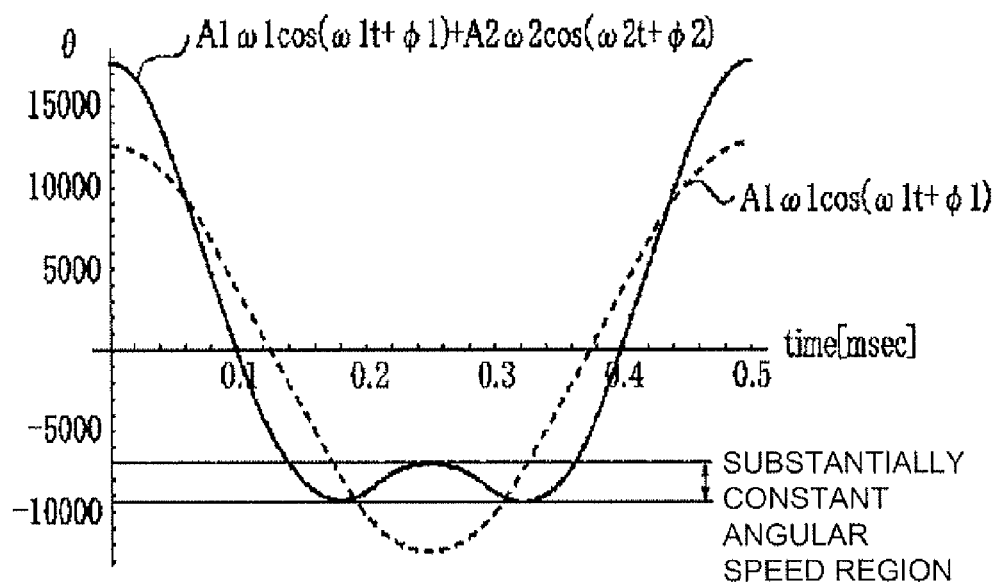

The vibrating motion of such oscillation system 100 is illustrated in FIG. 3A. Namely, the oscillation system produces a vibrating motion which is the composite of a vibrating motion represented by $\theta(t)=A_1 \sin(\omega_1 t)$ and a vibrating motion represented by $\theta(t)=A_2 \sin(\omega_2+\o)$. Furthermore, FIG. 3B shows the results obtained by differentiating expression (2) which represents the vibrating motion of this oscillation system. As shown in FIG. 3B, the oscillation system 100 has a period in which it moves approximately at a constant angular-speed.

Drive control means 150 generates such driving signal that causes the oscillation system to produce vibrating motion represented by expression (1) or (2), the driving signal being supplied to the aforementioned driving means.

With regard to the driving signal, any signal may be may be used provided that the oscillator produces oscillation represented by expression (1) or (2). For example, it may be a driving signal based on synthesizing sinusoidal waves. Alternatively, it may be a pulse-like driving signal. In the case of a driving signal based on synthesizing sinusoidal waves, as an example, the driving signal may be one that can be represented by an expression including at least a term $B_1 \sin \omega_1 t + B_2 \sin(\omega_2+\psi)$, where $\omega_2=2\times\omega_1$. Here, $B_1$ and $B_2$ are amplitude components, $\psi$ is the relative phase difference, $\omega_1$ and $\omega_2$ are angular frequencies, and t is time. In this case, a desired driving signal can be obtained by adjusting the amplitude and phase of each sinusoidal wave. Furthermore, if the driving is made using pulse-like signals, a desired driving signal can be generated by changing the pulse number, pulse spacing, pulse width or the like, with respect to time.

Displacement angle detecting means 140 can detect the displacement angle of at least one of the first oscillator 101 and the second oscillator 102. In the case of FIG. 1, the displacement angle detecting means 140 comprises a photodetector. A light beam 132 emitted from a light source 131 is reflected by the first oscillator 101, and the reflected light 133 is detected by this photodetector 140. Actually, there are two photodetectors 140 disposed at positions leaning to the center than the maximum displacement angle of the first oscillator. In other words, the photodetectors are disposed at the positions of BD1 and BD2 in FIG. 3A. By disposing the photodetectors in the manner described above, four time moments (t10, t20, t30 and t40) can be detected within a single period. The drive control means 150 detects the state of displacement of the oscillator based on these four time moments, and it generates a driving signal for driving the oscillation system based on the detected displacement state.

It should be noted that, although in this embodiment the oscillation of the oscillator is detected using photodetectors, a piezoresistor may be provided on the resilient supporting members 111 and 112, and the displacement state of the oscillator may be detected based on the output signal of the piezoresistor.

Next, the control of the displacement angle of the oscillator device in the present embodiment will be explained.

Figure 2:
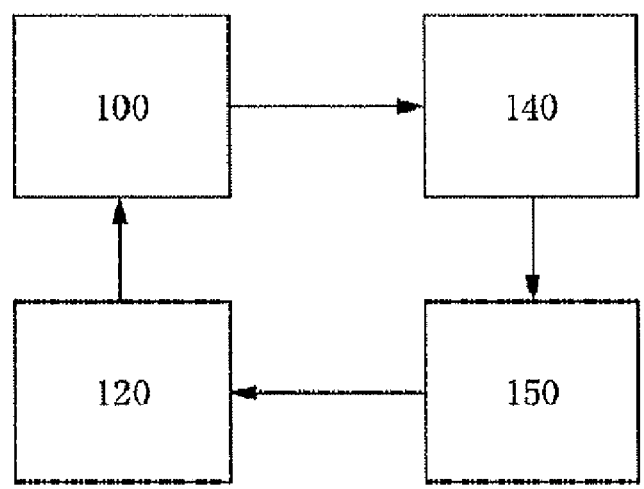
FIG. 2 is a block diagram of an oscillator device according to the present invention.

FIG. 2 is a block diagram of the oscillator device of the present embodiment. The driving means 120 applies a driving force to the oscillation system 100. Displacement sensing means 140 detects the displacement angle of the oscillator which constitutes an oscillation system. The drive control means 150 adjusts the driving force so that the oscillator takes a desired displacement angle.

The displacement angle detecting means 140 measures four different time moments during a single period of the aforementioned first vibrating motion, that is, two different time moments (t10 and t20) where the oscillator takes a first displacement angle and two different time moments (t30 and t40) where the oscillator takes a second displacement angle.

Since the oscillation of the oscillation system is expressed in terms of four variables or three variables as shown in expression (1) and expression (2), these variables can be calculated from the four measured time moments.

The drive control means 150 generates a driving signal based on synthesizing a first signal having a first frequency and a second signal having a second frequency, and supplies it to the aforementioned driving means 120. Additionally, it adjusts the driving signal so that the four measured time moments coincide with preset time moments. By supplying so adjusted driving signal to the driving means 120, the oscillator device can be controlled very precisely.

More specifically, the drive control means 150 calculates at least one of the values $A_1$, $\o_1$, $A_2$ and $\o_2$ of expression (1) which presents the displacement angle of the oscillator device, from the signal of the displacement angle detecting means 140. Then, the driving signal can be adjusted so that at least one of these values becomes equal to a preset value. Furthermore, in the case of expression (2), at least one of the values A1, A2 and ø is calculated, and the driving signal is adjusted so that at least one of these values becomes equal to a preset value. By supplying so adjusted driving signal to the driving means 120, the oscillator device can be controlled very precisely.

However, in the oscillator device of the present embodiment, depending on the relationship of the first and second resonance frequencies f1 and f2, the controllability thereof is different. Namely, the control characteristic of the oscillator device changes depending on the value of $\Delta f$ in expression (3).

$$\Delta f = f2 - 2 \times f1 \quad (3)$$

Here, when $\Delta f$ is in the relationship of expression (4), the control characteristic of the oscillator device of the present embodiment improves.

$$\Delta f < 0 \quad (4)$$

On the other hand, among the first driving signal having a first driving frequency and the second driving signal having a second driving frequency, the lower-frequency side driving frequency is denoted by Df1 and the higher-frequency side driving frequency is denoted by Df2. Here, if the oscillator device is driven by driving frequencies Df1 and Df2 which satisfy the conditions of expression (5), expression (6) and expression (7), the control characteristic is improved furthermore.

$$Df1 < f1 \quad (5)$$

$$Df2 \leq f2 \quad (6)$$

$$Df1 \times 2 = Df2 \quad (7)$$

Figure 6:
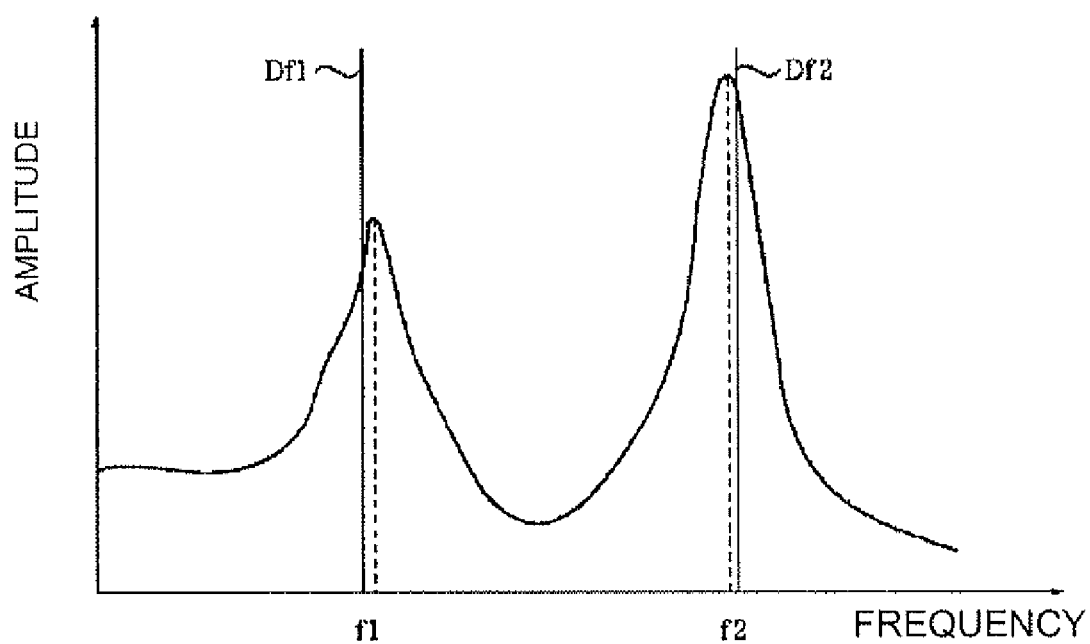
FIG. 6 is a diagram illustrating an example of the relationship between the resonance frequencies f1 and f2 and the driving frequencies Df1 and Df2 of the oscillation system.

FIG. 6 is a diagram exemplifying the relationship between the resonance frequencies f1 and f2 of the oscillation system of the present embodiment and the driving frequencies Df1 and Df2. If the conditions of expression (3) and expression (8) are satisfied and, in addition, the conditions of expression (5), expression (6) and expression (7) are satisfied, the two resonance frequencies f1 and f2 are present between the driving frequencies Df1 and Df2 as shown in FIG. 6.

It should be noted that, in this embodiment, the oscillator device may be driven under the condition of Df1=f1 in place of the condition of expression (5). Alternatively, it may be driven under the condition of Df2=f2 in place of the condition of expression (6). Particularly, when the drive is made to meet Df2=f2 or to cause Df2 to come close to f2 as much as possible, the oscillator device can be drive-controlled more precisely.

Here, in order to illustrate that the control characteristic of the oscillator is improved when the present invention is used, the difference of the open-loop transfer characteristic of $A_1$ which is one of the control parameters of expressions (1) and (2) presenting the displacement angle of the oscillator of the oscillator device will be explained.

Figure 4A:
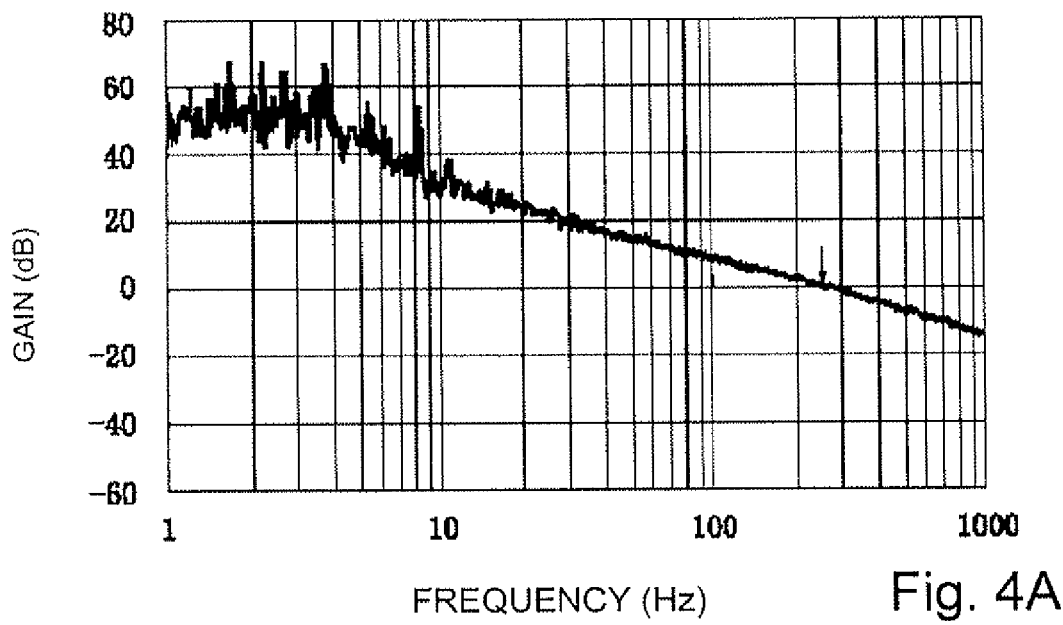
Figure 4B:
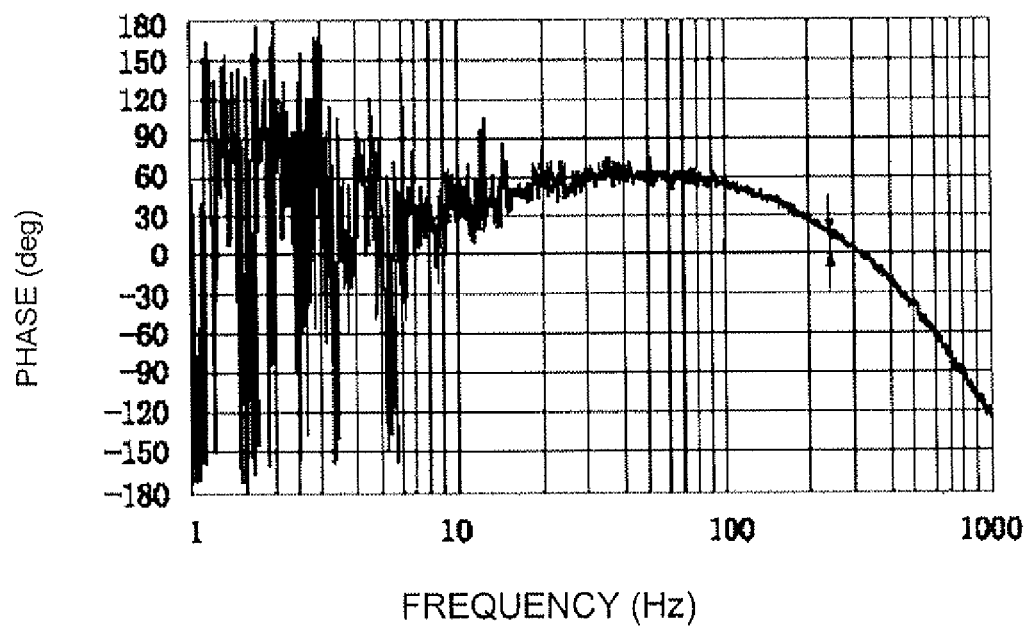

FIGS. 4A and 4B are diagrams illustrating the open-loop transfer characteristic in a case where f1=2531 Hz, f2=5068 Hz, Df1=2534 Hz, Df2=5068 Hz and Δf=+6 Hz. FIG. 4A shows the gain characteristic and FIG. 42 shows the phase characteristic.

Figure 5A:
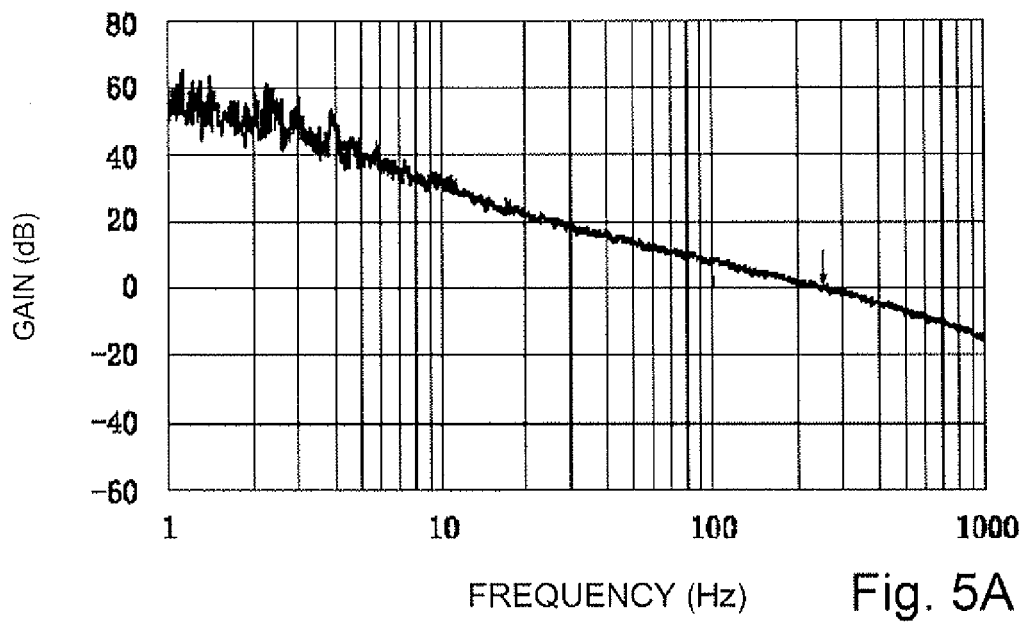
Figure 5B:
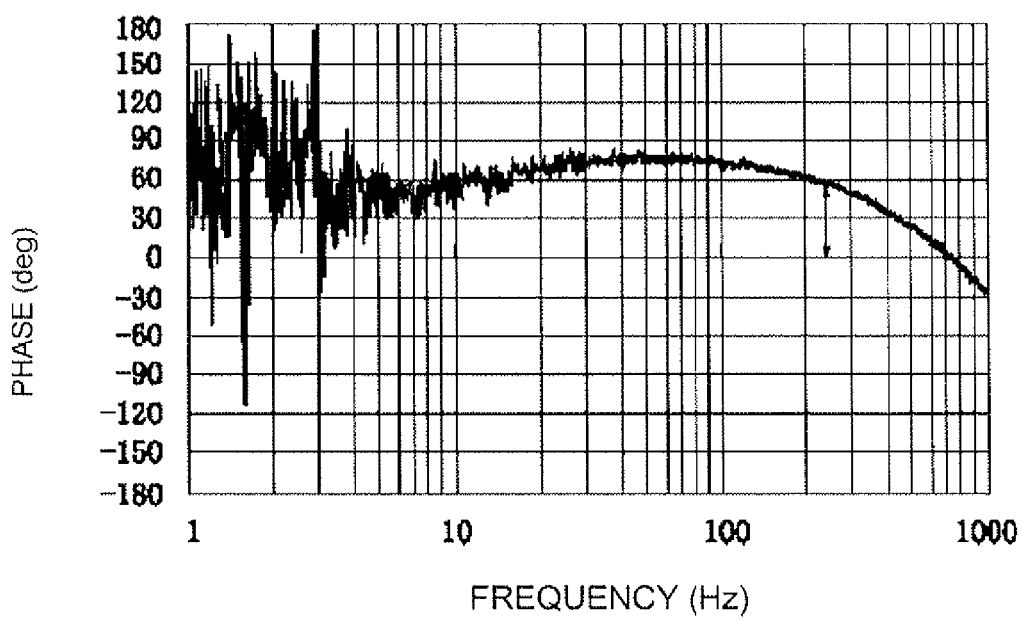

Furthermore, FIGS. 5A and 5B are diagrams illustrating the open-loop transfer characteristic in a case where f1=2523 Hz, f2=5040 Hz, Df1=2520 Hz, Df2=5040 Hz and Δf=−6 Hz. FIG. 5A shows the gain characteristic and FIG. 5B shows the phase characteristic.

Comparing FIG. 4B and FIG. 5B, it is seen that, in the case where Δf is +6 Hz as compared with the case where Δf is −6 Hz, there is a large phase delay particularly in the band of 100 Hz or higher.

For example, comparing the phase at 260 Hz where the gain becomes equal to zero, it is seen that, although it is only 18 deg. in the case of Δf=+6 Hz, it is as large as 55 deg. in the case of Δf=−6 Hz and thus the phase margin is quite large.

If the phase margin is large as described, the stability against external disturbance is improved. Furthermore, since the gain can be increased if the phase margin is large, the control band goes up which in turn leads to a reduction of the jitter.

If, to the contrary, the phase margin is small, the stability against external disturbance is degraded. Furthermore, in order to enlarge the phase margin, the gain has to be lowered until a sufficient phase margin (e.g., 30 deg.) is obtained. Namely, since in this case the gain is lowered, the control band goes down which in turn causes an increase of the jitter.

It is seen from the above that the phase margin can be made larger in the oscillation system of Δf=−6 Hz as compared with the oscillation system of Δf=+6 Hz and that, as a result of this, the jitter can be reduced more and the oscillator device can be controlled more precisely. Hence, when the oscillation system of the oscillator device of the present embodiment is made to satisfy the relationships of expression (3) and expression (4) mentioned above, the control characteristic of the oscillator device is improved.

Figure 7:
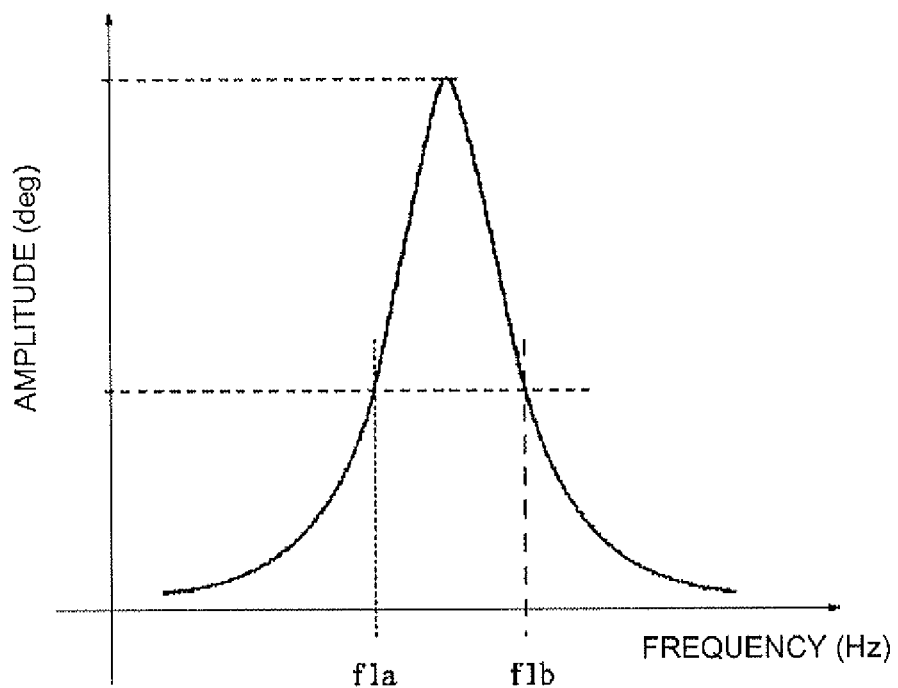
FIG. 7 is a diagram showing the resonance characteristic (the relationship between the driving frequency and the amplitude) around the first resonance frequency f1.

FIG. 7 illustrates the resonance characteristic (the relationship between the driving frequency and the amplitude) around the first resonance frequency f1. It is seen from FIG. 7 that, if the driving frequency deviates from the position of the resonance point where the amplitude value of the oscillator becomes largest, the amplitude value of the oscillator decreases. In other words, the driving efficiency of the oscillator device is slowed down. Although in the condition mentioned above the range of Δf is limited solely to the minus side, since the driving efficiency is slowed down if the driving frequency largely deviates from the resonance frequency, it results in an increase of the power consumption or generation of heat, for example. Therefore, in this case, the driving efficiency at the first resonance frequency should be taken into account and the range of Δf should be limited to the range of expression (8). Then, the oscillator device can be driven more efficiently.

$$-2\times(f1b-f1a) \leq \Delta f < 0 \qquad (8)$$

Here, f1a denotes the frequency with which, at the lower-frequency side of the resonance peak of the first resonance frequency f1, the vibrational energy becomes equal to the mesial magnitude of the resonance peak, and f1b denotes the frequency with which, at the higher-frequency side of the resonance peak, the vibrational energy becomes equal to the mesial magnitude of the resonance peak.

Figure 8:
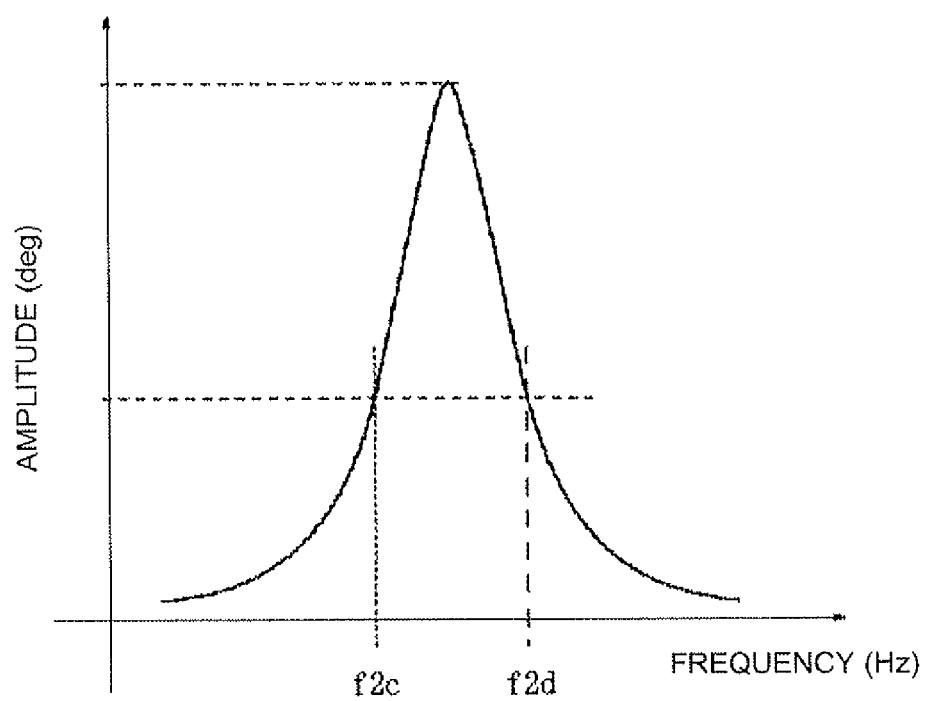
FIG. 8 is a diagram showing the resonance characteristic (the relationship between the driving frequency and the amplitude) around the second resonance frequency f2.

FIG. 8 illustrates the resonance characteristic (the relationship between the driving frequency and the amplitude) around the second resonance frequency f2. It is seen from FIG. 8 that, if the driving frequency deviates from the position of the resonance point where the amplitude value of the oscillator becomes largest, the amplitude value of the oscillator decreases. In other words, the driving efficiency of the oscillator device is slowed down. Although in the condition mentioned above the range of Δf is limited solely to the minus side, since the driving efficiency is slowed down if the driving frequency largely deviates from the resonance frequency, it results in an increase of the power consumption or generation of heat, for example. Therefore, in this case, the driving efficiency at the first resonance frequency should be taken into account and the range of Δf should be limited to the range of expression (9). Then, the oscillator device can be driven more efficiently.

$$(f1d-f1c) \leq \Delta f < 0 \qquad (9)$$

Here, f1c denotes the frequency with which, at the lower-frequency side of the resonance peak of the second resonance frequency f2, the vibrational energy becomes equal to the mesial magnitude of the resonance peak, and f1d denotes the frequency with which, at the higher-frequency side of the resonance peak, the vibrational energy becomes equal to the mesial magnitude of the resonance peak.

On the other hand, during the manufacturing process of the oscillation system of the oscillator device, an error occurs in the spring constant of the resilient supporting member or in the inertia moment of the oscillator when the oscillation system is made. This means that an error occurs in the resonance frequency of the oscillation system which is determined by the spring constant of the resilient supporting member and the inertia moment of the oscillator. In such case, an error of Δf resulting from the error of the resonance frequency may be predicted beforehand and, from this error amount, the range for Δf may be determined. Here, the error of Δf may be detect theoretically by calculating the error amount of the spring constant or the inertia moment or, alternatively, it may be detected statistically from errors of Δf of manufactured devices. By limiting the range of Δf as shown in expression (10) based on the predicted error amount of Δf, regardless of manufacture dispersions the oscillator can be made within the range of Δf<0.

$$(\Delta fu - \Delta f1) \leq \Delta f < 0 \qquad (10)$$

Here, Δf1 denotes the lower-limit side minimum value within the dispersion range of Δf, and Δfu denotes the upper-limit side maximum value.

Second Embodiment

Figure 9:
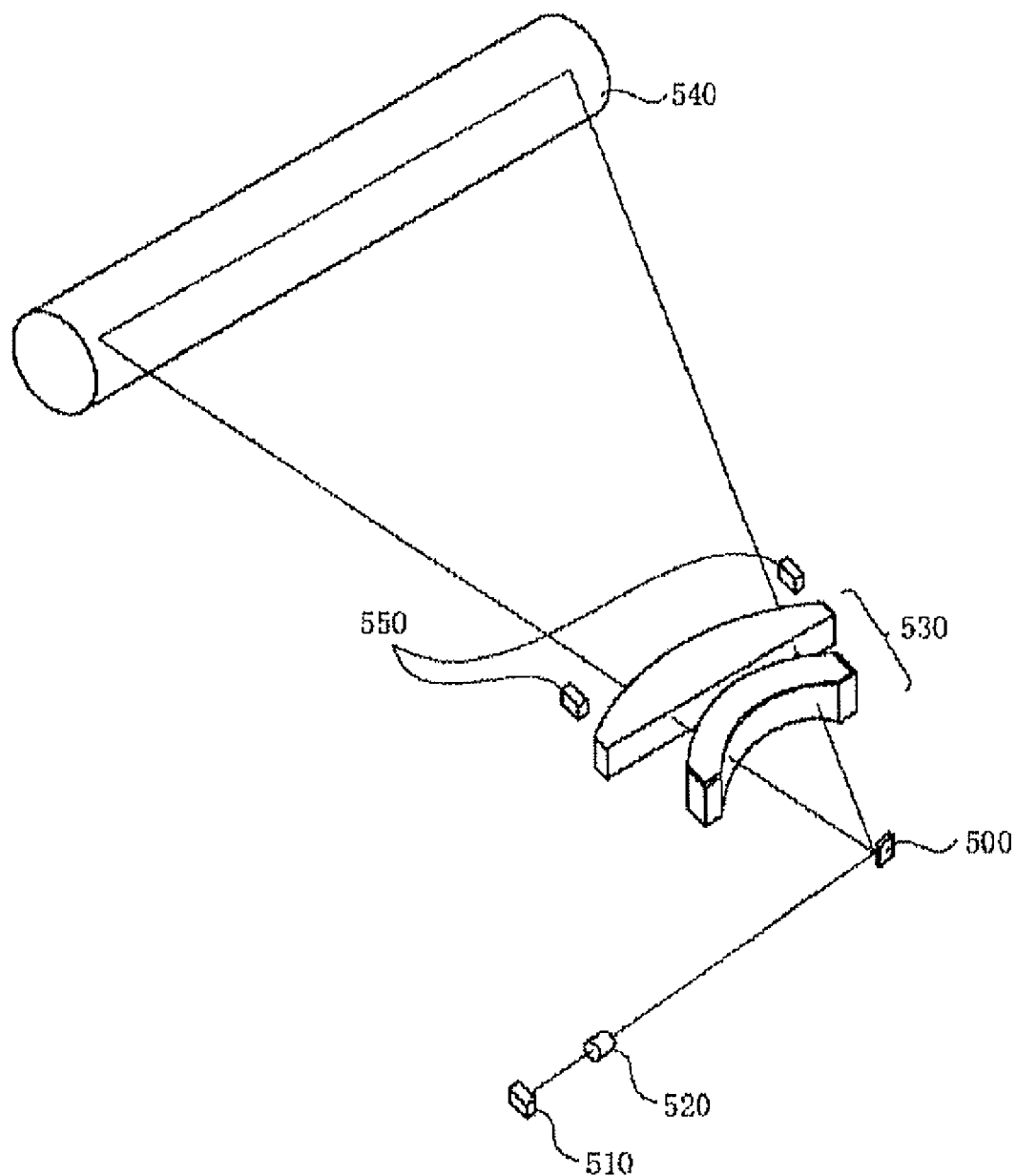
FIG. 9 is a diagram illustrating an image forming apparatus using an oscillator device according to the present invention.
Figure 10:
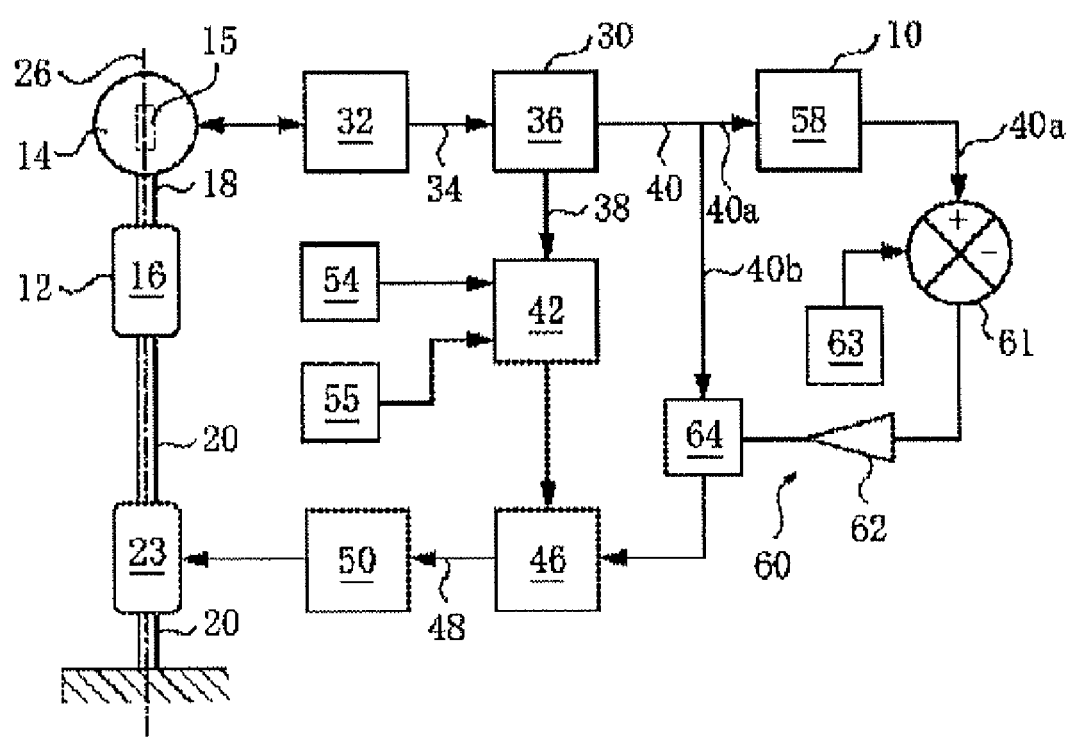
FIG. 10 is a block diagram which shows the structure of a conventional optical deflecting device.

Referring to FIG. 9, an embodiment in which an oscillator device according to the present invention is applied to an image forming apparatus will be explained.

An optical deflecting device 500 to be used in an image forming apparatus of the present embodiment corresponds to an oscillator device described with reference to the first embodiment. A light beam emitted from a light source 510 is shaped by a collimator lens 520 which is an optical system and, after this, it is deflected one-dimensionally by the optical deflecting device 500. The thus deflected scanning light is collected by a coupling lens 530 which is an optical system toward a target position on a photosensitive member 540. By this, an electrostatic latent image is formed on the photosensitive member 540. There are two photodetectors 550 disposed at the scan ends of the optical deflecting device. The optical deflecting device 500 detects the vibrational state of the oscillator in the manner having been described with reference to the first embodiment, and a driving signal is determined.

In the image forming apparatus of the present embodiment, by making the range of $\Delta f$ matched with that of the first embodiment, an image forming apparatus of better control characteristic and higher precision can be accomplished.

While the invention has been described with reference to the structures disclosed herein, it is not confined to the details set forth and this application is intended to cover such modifications or changes as may come within the purposes of the improvements or the scope of the following claims.

The invention claimed is:

1. An oscillator device, comprising:
   an oscillation system including a first oscillator, a second oscillator, a first resilient supporting member configured to connect said first oscillator for torsional oscillation about a torsion axis relative to said second oscillator, and a second resilient supporting member configured to support said second oscillator for torsional oscillation about a torsion axis relative to a fixed member;
   driving means configured to drive said oscillation system; and
   drive control means configured to supply a driving signal to said driving means;
   wherein said oscillation system has at least two frequencies of natural oscillation mode around the torsion axis which include a first resonance frequency f1 and a second resonance frequency f2,
   wherein there is a relationship that f2 is approximately two-fold of f1,
   wherein $\Delta f$ which is expressed as $\Delta f = f2 - f \times f1$ has a relationship of $\Delta f < 0$, and
   wherein said drive control means supplies, to said driving means, a driving signal which is comprised of a driving signal based on synthesizing a first driving signal having a first driving frequency and a second driving signal having a second driving frequency, and which is such driving signal that, when a lower-frequency side driving frequency among the first and second driving frequencies is denoted by Df1 and a higher-frequency side driving frequency is denoted by Df2, it satisfies relationships Df1<f1

Df2>f2

$Df1 \times 2 = Df2$.

2. An oscillator device as claimed in claim 1, wherein, when a displacement angle of said oscillator is denoted by $\theta$, an amplitude of a first vibrating motion is denoted by $A_1$, an angular frequency of the first vibrating motion is denoted by $\omega_1$, an amplitude of a second vibrating motion is denoted by $A_2$, an angular frequency of the second vibrating motion is denoted by $\omega_2$ ($\omega_2 = 2 \times \omega_1$), a relative phase difference of the two frequencies is denoted by $\emptyset$, and time is denoted by t, said drive control means supplies to said driving means a driving signal effective to cause at least one of said first and second oscillators to produce oscillation which is represented by an expression:

$$\theta(t) = A_1 \sin\omega_1 t + A_2 \sin(\omega_2 t + \emptyset).$$

3. An oscillator device as claimed in claim 1, wherein, when, at a lower-frequency side of a resonance peak of the first resonance frequency f1, a frequency with which a vibrational energy becomes equal to a mesial magnitude of a resonance peak is denoted by f1a and, at a higher-frequency side, a frequency with which the vibrational energy becomes equal to the mesial magnitude of the resonance peak is denoted by f1b, $\Delta f$ is in a relationship of $$-2 \times (f1b - f1a) \leq \Delta f < 0.$$

4. An oscillator device as claimed in claim 1, wherein, when, at a lower-frequency side of a resonance peak of the second resonance frequency f2, a frequency with which a vibrational energy becomes equal to a mesial magnitude of a resonance peak is denoted by f1c and, at a higher-frequency side, a frequency with which the vibrational energy becomes equal to the mesial magnitude of the resonance peak is denoted by f1d, $\Delta f$ is in a relationship of $$(f1d - f1c) \leq \Delta f < 0.$$

5. An oscillator device as claimed in claim 1, wherein, when a lower-limit side minimum value in a dispersion range of $\Delta f$ of said oscillation system is denoted by $\Delta f1$ and an upper-limit side maximum value is denoted by $\Delta fu$, $\Delta f$ is in a relationship $$(\Delta fu - \Delta f1) \leq \Delta f < 0.$$

6. An optical deflector including an oscillator device as claimed in claim 1, wherein said first oscillator is provided with an optical deflection element.

7. An image forming apparatus, comprising:
   an optical deflector as claimed in claim 6;
   an optical system;
   a light source; and
   a photosensitive member,
   wherein a light beam from said light source is scanningly deflected by said optical deflector, and the scan light is collected by said optical system at a target position on said photosensitive member.

* * * * *